US008358195B2

(12) United States Patent
Giles

(10) Patent No.: US 8,358,195 B2
(45) Date of Patent: Jan. 22, 2013

(54) DELIVERY AND COLLECTION SYSTEM

(75) Inventor: Terence Giles, Surrey (GB)

(73) Assignee: Delivery Works Limited, London (GB)

( * ) Notice: Subject to any disclaimer, the term of this patent is extended or adjusted under 35 U.S.C. 154(b) by 607 days.

(21) Appl. No.: 12/596,869

(22) PCT Filed: Apr. 25, 2008

(86) PCT No.: PCT/GB2008/050297

§ 371 (c)(1),
(2), (4) Date: Oct. 21, 2009

(87) PCT Pub. No.: WO2008/132506

PCT Pub. Date: Nov. 6, 2008

(65) Prior Publication Data

US 2011/0041573 A1 Feb. 24, 2011

(30) Foreign Application Priority Data

Apr. 25, 2007 (GB) .................................. 0707928.8
Feb. 1, 2008 (GB) .................................. 0801882.2

(51) Int. Cl.
*G05B 19/00* (2006.01)
*G06F 7/00* (2006.01)
*H04B 1/00* (2006.01)
*H04Q 1/00* (2006.01)

(52) U.S. Cl. .......................... 340/5.51; 340/5.6; 340/5.7

(58) Field of Classification Search ................. 340/5.51, 340/5.6, 5.61-5.66, 5.7; 70/63, 168, 277, 70/278.1; 109/59, 64; 455/557; 380/286
See application file for complete search history.

(56) References Cited

U.S. PATENT DOCUMENTS

| | | | | |
|---|---|---|---|---|
| 4,281,216 | A * | 7/1981 | Hogg et al. | 380/277 |
| 4,847,614 | A | 7/1989 | Keller | |
| 5,397,884 | A | 3/1995 | Saliga | |
| 6,300,873 | B1 | 10/2001 | Kucharczyk | |
| 6,696,918 | B2 * | 2/2004 | Kucharczyk et al. | 340/5.21 |
| 7,012,503 | B2 * | 3/2006 | Nielsen | 340/5.6 |
| 2003/0231102 | A1 | 12/2003 | Fisher | |

FOREIGN PATENT DOCUMENTS

| | | |
|---|---|---|
| GB | 2372126 | 8/2002 |
| WO | 01/91074 | 11/2001 |
| WO | 02/31296 | 4/2002 |
| WO | 2006/109097 | 10/2006 |

OTHER PUBLICATIONS

International Search Report for International Application No. PCT/GB2008/050297, mailed Sep. 4, 2008.
Written Opinion of the International Searching Authority for International Application No. PCT/GB2008/050297, mailed Sep. 4, 2008.

* cited by examiner

*Primary Examiner* — Nam V Nguyen
(74) *Attorney, Agent, or Firm* — K&L Gates LLP

(57) ABSTRACT

A delivery system uses secure containers each equipped with means such as a keypad (8) or barcode reader (10) to input a single use delivery key. The delivery key is generated by an external code generator that produces pseudo noise codes. A generator (20) that produces the same sequence is provided in the lock and synchronization between the two generators is provided by the delivered items.

7 Claims, 3 Drawing Sheets

DELIVERY AND COLLECTION SYSTEM

CROSS REFERENCE TO RELATED APPLICATIONS

This application is the U.S. National Phase Application of International Patent Application Serial No. PCT/GB2008/050297, filed Apr. 25, 2008, published under PCT Article 21(2) in English, which claims priority to and the benefit under 35 U.S.C. Section 365 of Great Britain Patent Application Serial No. 0707928.8, filed Apr. 25, 2007, and Great Britain Patent Application Serial No. 0801882.2, filed Feb. 1, 2008, the entire disclosures of each of which are incorporated by reference herein.

TECHNICAL FIELD

The home delivery problem presently restricts the growth of mail order and internet sales or any other remote purchasing mechanic.

Internet retail or auction sales are reliant on the efficient and effective delivery of goods to customers. The need for customers to be available or to make arrangements to accept goods too large for delivery through a standard letterbox is an inconvenience potentially deterring customers from making internet retail purchases. If the customer is not available to accept the goods, the goods are often not delivered and returned to the distribution point. A new date for delivery must then be scheduled or the customer has to collect the goods from a central location, such as the carrier's depot. From a seller's perspective, requesting a carrier to deliver goods to a customer at an allocated time on a specified date is inefficient and expensive. The same problem arises in respect of goods that need to be returned or for private sellers who need to send parcels and packets that they would rather have collected from their premises.

The problem has been addressed by the use of secure containers that can be opened by single use access codes that enable a delivery person to gain entry to a secure container to deposit or collect goods.

BACKGROUND ART

Patent Citation 0001: GB 2372126 A (CODED ACCESS LTD). 2002-Aug.-14.

is an example of this type of system. A server accessible over the internet holds a secure database capable of generating an access code that will provide one time access to a known lock. Codes of other durations are also taught. In one suggested embodiment the code is calculated using an algorithm that takes as parameters the validity date/time and the lock number. The lock operates a similar algorithm to generate candidate codes in order to compare them to a received code. In order for the candidate codes to match the generated codes the parameters must be the same and this requires a clock in the lock.

Coded Access failed to implement a viable commercial system. Others including

Patent Citation 0002: WO WO 01/91074 A (MILLER). 2001-Nov.-29.

have suggested similar secure delivery systems with the common feature that it is the parcel itself which carries the "key" to unlock the secure container to which it will be delivered. Miller suggests the use of a barcode for the key.

The present applicant has also proposed a system described in

Patent Citation 0003: WO WO 2006/109097 A (DELIVERY WORKS LIMITED).

which relies on the master key being used in the generation of the single use transaction-unique delivery key and the storage of used keys within the lock. Delivery Works describes a delivery system comprising a combination lock providing access to a delivery space and an external delivery key generator, the lock comprising means for inputting a delivery key; processor means for validating the delivery key, means for releasing the lock in response to a valid delivery key, and storage means for identifying used delivery keys.

Patent Citation 0004: U.S. Pat. No. 6,300,873 A (ATLANTES SERVICES INC). 2001-Oct.-09.

also describes a delivery system which is primarily directed to a system in which the locking device is in communication with a server that issues a delivery key. It also recognizes that it is desirable to have a stand-alone locking device and emphasises the desirability of one time single use codes that expire after use, but there is no disclosure of how this would work with a stand-alone locking device. The approach taken in this citation is maintaining identical access code tables at the server and locking devices. In the embodiment which uses a stand-alone locking device, the server and locking device each have a similar random number generator. This scheme cannot cope with the overlapping delivery/pickup scenario and the inventor suggests that several access codes are generated at a time by the server and the generator in the locking device. This is not a complete solution to the problem as, without communication, the locking device processor may recognize an access code ahead of the next code in the sequence but still within the window, it will then reject the earlier missed access code. There is no teaching as to how one-time use is achieved within this embodiment.

DISCLOSURE OF INVENTION

The proposed systems to date have been proprietary and require the delivery service and/or the retailer to subscribe to a service. In order to provide greater flexibility to the user of the secure container it is preferable to offer a service that is open for access to all and can be used by a consumer to accept all his or her deliveries.

It is also undesirable to have communications equipment in the secure container or dependency on a clock.

Technical Problem

A technical problems encountered with combination locks that can respond to multiple keys is the need for the lock to be able to validate a key within a short period. Coded Access solves this problem by using time as the means of synchronisation.

Technical Solution

Relative to the closest prior art shown in Atlantes, the present invention provides a delivery system comprising a combination lock providing access to a delivery space and an external delivery key generator processor means; the lock comprising at least one means for inputting a delivery key, processor means for validating the delivery key, means for releasing the lock in response to a valid delivery key, wherein the processor means and the external delivery key generator processor means each comprise a pseudo noise (PN) code generator that generates the same sequence of delivery keys, characterised in that the lock further comprises storage means for used delivery keys, and in that the lock validating processor means uses a recent valid delivery key to provide a pointer; the validating processor being programmed to cause the pseudo noise (PN) code generator to generate a next delivery key after that pointer to compare with an input key and, if a match is not found, moving the pointer and repeating a cycle of generating and matching with an input key for a predetermined number of cycles.

Preferably the pointer identifies a point in the PN sequence that is displaced by a predetermined number of codes before the position of the delivery key.

In addition, if a match is not found within the predetermined number of cycles, the process may be repeated with a pointer set by another of the stored valid delivery keys.

Advantageous Effects

Using the deliveries themselves as a form of token that passes between the two processors as a mechanism to maintain synchronisation allows the use of long and inherently secure delivery keys. The need for the lock to communicate with the external processor is obviated and there is no need for time constraints on deliveries or a clock in the lock.

BRIEF DESCRIPTION OF DRAWINGS

In order that the invention may be well understood, an embodiment thereof will now be described, by way of example only, with reference to the accompanying diagrammatic drawings, in which.

MODE(S) FOR CARRYING OUT THE INVENTION

Figure 1:
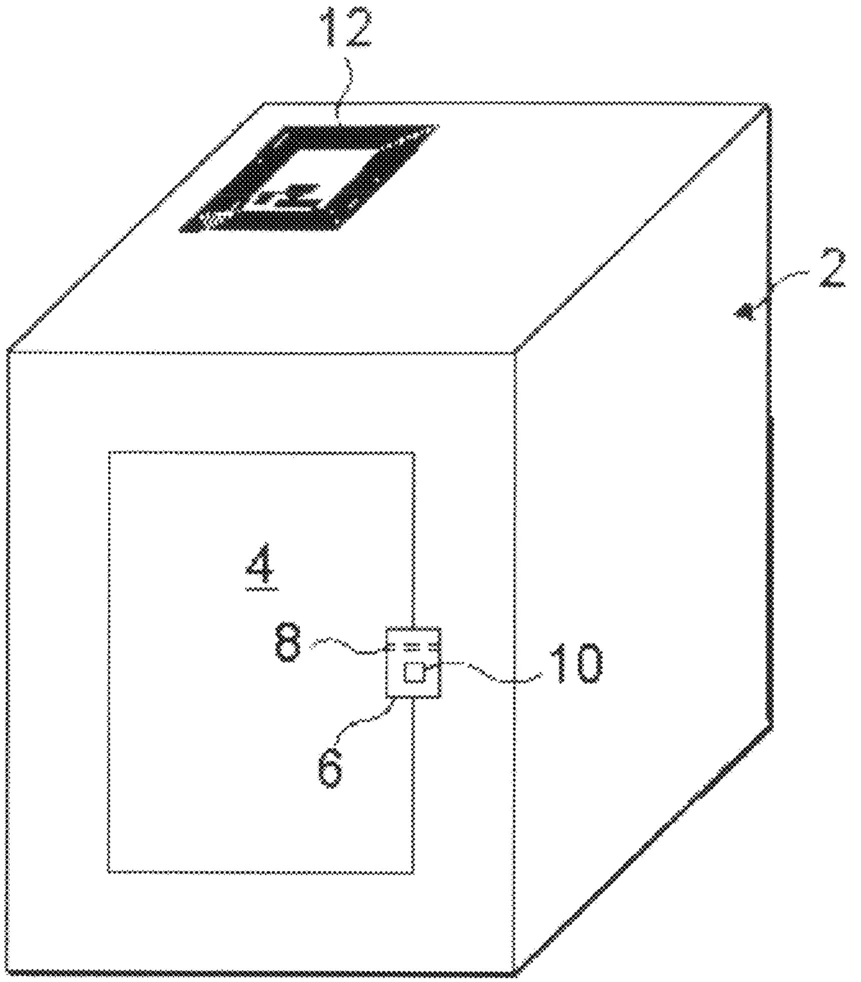
FIG. 1 illustrates a secure container with a lock in accordance with the invention.

As shown in FIG. 1, a secure container 2 has a hinged access door 4 fastened by a latch (not shown) releasable by a lock 6. A keypad 8 is provided as a way of inputting a delivery key or master key in order to open the lock.

A reader 10 is also provided as a means of inputting a delivery key by scanning a barcode printed onto a label applied to an item to be delivered. The input means could alternatively be a reader capable of reading an RFID tag that could be used in place of a barcode on the delivered item. The reader 10 is shown on the lock 6 but could be positioned anywhere on or adjacent to the container provided its output can be connected to the lock electronics as described below. The secure container 2 is a box of durable material such as metal or plastic that can be fixed securely in a location at a customer's delivery address. The container provides a delivery space. The container could, for example, be built into a wall in the manner of containers for utility meters. The container 2 is provided with means for advertising its presence such as an RFID tag or GPS tracking locator 12. The door 4 can be on any of the faces of the container 2 and is securely fastened by the latch of lock 6.

The lock 6 could also be fitted to a door that gives access to an alternative delivery space such as the interior of a shed, garage or storage room.

Figure 2:
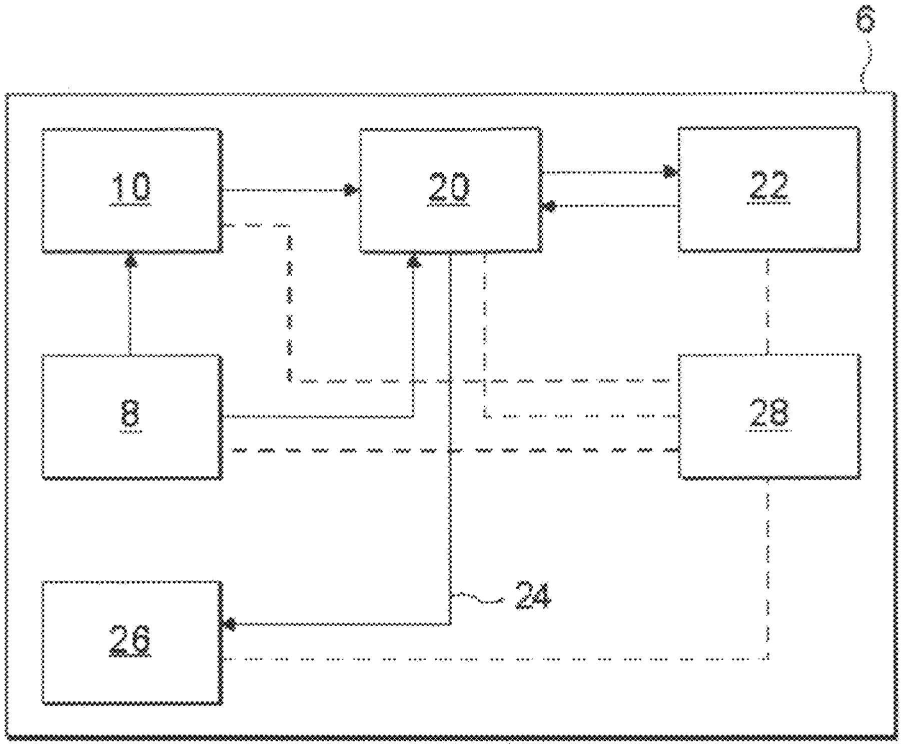
FIG. 2 is a block diagram of the electronics in the combination lock.

As shown in FIG. 2, the lock 6 contains a processor 20, which receives inputs from the delivery key reader 10. A storage means or memory 22 is connected to the processor. The processor 20 also has an output 24 that controls a latch actuator 26. A power supply 28 is also provided to provide power to the barcode reader 10, processor 20, and memory 22 and latch actuator 26.

The power supply 28 may be a battery, solar cell or other energy source. Where a battery is used to power the lock, an indicator is provided on the face of the lock to indicate when battery power is low and the batteries need to be replaced. In the event of power failure the lock will fail closed. Once the batteries have been replaced, the lock can be opened in the normal way.

The lock is also provided with means for interrogating the memory 22 to carry out delivery investigations.

In order to use the described secure container 2 as part of a delivery system it is necessary to provide an external delivery key generator. This will typically reside on a computer server accessible via a secure Internet interface. The owner of the secure container 2 and trusted retailers may have access to the delivery key generator. A key generated by the external generator can be in the form of a number or in the form of a ready to print barcode. The server preferably generates a complete label suitable for attachment to the goods to be delivered. For example, a user could input the postcode or some other address element and the server would offer a list of registered secure container owners with addresses that matched so that the user could select the appropriate one and generate a label image complete with the delivery address and delivery key. The generated label image can be printed locally or transmitted via standard means such as email or post to a third party so that they can affix it to an item to be delivered.

The processor 20 in the lock is also a generator that generates the same sequence as the external generator. This is for example a 10 million long key sequence. An initial offset from the start of the sequence is pre-stored in memory 22 and this is matched at initialisation of the system with a pointer in the external generator so that both generators start at the same point in the sequence. Different locks can have different offsets to reduce the likelihood of a delivery key for one lock working with a different one. It would also be possible for the generators to be primed with the same seed.

Synchronisation between the two generators is maintained by the delivered items.

Pseudo noise (PN) codes are the basis of most modern communication systems such as Bluetooth, WiFi, UMTS and 3G. The codes are based on using Linear Feedback Shift Registers (LFSR) of varying lengths picked to suit the application. In the Delivery Works system the LFSR will have a large number of stages, perhaps as many as 100, which will generate unique code sequences longer than a billion billion elements.

The initial offset stored into the lock may be a factory set number or be set by the owner so as to be individual to him (such as part of a credit card number). The same offset must be set in the external delivery key generator and the generator in the lock. The delivery keys generated appear to be random numbers so that without knowing the initial offset or seed and the algorithm used by the generator it is impossible to determine another valid key from any other delivery key. Therefore provided that the lock only responds to each delivery key once, there is no need for any special security arrangements to be made for disposal of used keys.

The processor 20 and external generator may be implemented using any low-cost general-purpose microprocessor. The important thing is to have a micro controller with program code that is inaccessible in order to prevent the algorithm from being cracked or copied.

The memory 22 stores the initial offset used by the generator and continues to serve as a pointer indicating the number in the sequence of codes of the last accepted delivery key. The memory 22 also stores delivery keys that have been used and data relating to the time of access. It should be noted that a delivery key also represents a pointer to a position in the sequence of PN codes. The memory may also store keys that have been used and other data such as time of access of attempts to open the lock that have been denied.

The processor means 20 contains a stored program which runs on each input of a new delivery key in an attempt to match that delivery key with an unused valid delivery key. If all the delivery keys were generated and used in strict sequence as envisaged in Patent Citation 0005: U.S. Pat. No. 6,300,873 B (ATLANTES SERVICES, INC). 2001-Oct.-09.

then all that is necessary is for the processor to attempt a match with the next code in the sequence. However, items may be delivered out of sequence and some generated delivery keys may never be used at all. Therefore the processor means initially generates a code using the last stored valid delivery key as a pointer. The pointer starts the generation process at a point in the sequence displaced before that of the last key by, say 32 codes and then produce the next code in the sequence from that point. If this code does not match the input key then the processor steps forward to generate the next code. This process is repeated for a predetermined number of cycles, for example 64 or until a match has been found. When a match is found the processor checks that the key has not been used before and releases the latch. At this stage if no match has been found in a low usage system the processor could determine that the key is invalid and store it as such. However if there is significant irregularity of deliveries the processor may move on to use a previously stored delivery key as the pointer to generate a code to compare with the input key. If the keys had been used in sequence this would simply generate the last valid key and it would not be necessary to go through the predetermined number of cycles using this pointer. However, if the keys had been used out of sequence it would generate codes not previously tested. The program may continue to track back through previously stored keys in an attempt to find a match before declaring that the input key is invalid and storing it without opening the lock.

The number of cycles, the value of the displacement of the pointer before the last key and the number of previously stored keys used as pointers may be adjusted in dependence on the situation of the lock and/or history of matching performance.

In this embodiment the last valid delivery key defines the stored offset or pointer. However, if it has been necessary to go through a prolonged number of matching attempt cycles, the process may retain the previously set offset, ie not replace the valid delivery key to be used as the starting pointer with the latest key. The recent valid delivery key to be used as the starting point is therefore chosen as the one most likely to produce a match within a reasonable number of processing cycles relying on analysis of the matching history. This prevents the synchronisation between the two generators being thrown out by the use of a particularly old key.

Initial Registration and Synchronisation

When a new secure container is added to the system it must first be registered with the external delivery key generator and the initial offset or seed passed over. This could be done via a secure website. An access code for the initial access could be provided with the container when it is purchased. This would allow the customer to log on and pass the initial offset or seed to the external system. The initial offset could be programmed into the generator in the lock 6 on manufacture and inscribed on an internal surface of the container. Alternatively the customer could set the initial offset by using the keypad 8. If the initial offset is set in this way it may relate to data personal to the purchaser of the secure container such as a part of a credit card number or date of birth of the user. This registration process only needs be carried out once and there is no need for the customer to prime the lock to make it ready to receive deliveries when making purchases as with other systems.

Figure 3:
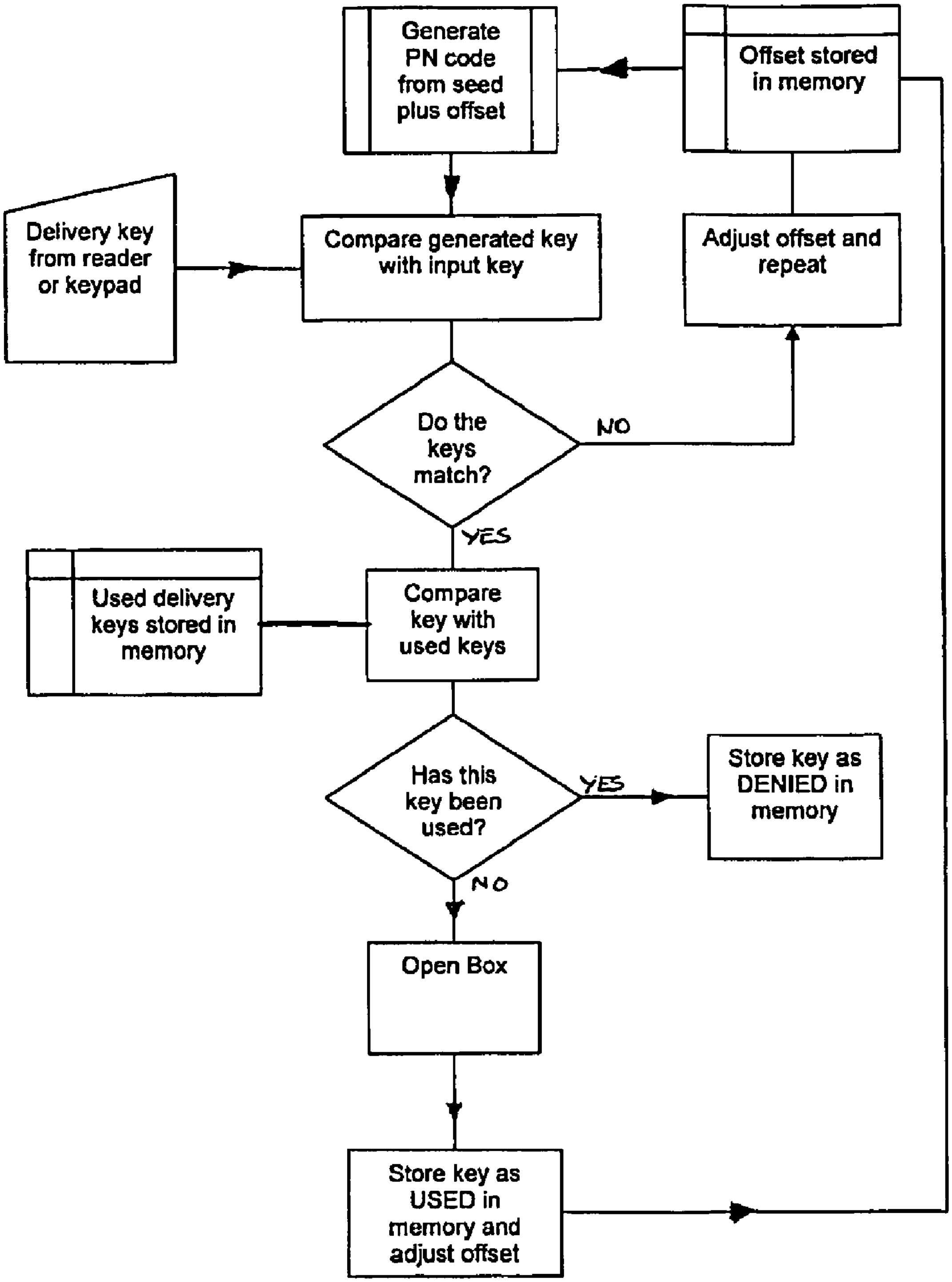
FIG. 3 is a flow diagram illustrating the use of the system.

When an item is to be delivered to a specified secure container, a delivery key is generated by the external generator. The delivery key is then applied to the item to be delivered along with the delivery address. This can be done by printing the code as a barcode or a number on an address label to be fixed to the item. Since the address of the secure container can be stored in the server of the external delivery key generator, a label with all the required information for delivery can be generated from that source. This label can carry instructions that the item is to be left in the secure container and that presentation of the barcode to the reader or entry of the number on the keypad will allow the container to be opened once only. The label may also bear a logo that matches a logo prominently displayed on the secure container so that a delivery person will readily be able to recognise the container as the right place to make the delivery. When the item reaches the secure container the delivery person presents the barcode to the reader 10 on the secure container 2. Alternatively if the code is presented as a number with a series of digits, the delivery person would key in the digits on the keypad 8. The processor then carries out the process illustrated in the flow diagram of FIG. 3 in order to determine whether or not to operate the latch actuator 26.

Items for which delivery keys have been issued may not be delivered in the same sequence and some delivery keys may never be used because of spoilage of labels during printing or for other reasons. Therefore the processor attempts to make a match with the code in the sequence that matches the stored offset or is within a pre-set interval—say 10 codes—either side of the expected next code in the sequence. This process has been described in more detail above. Using this process and resetting the stored offset after each delivery allows the generators in the container lock and the external server to remain substantially in synchronism without the need to resort to any other synchronisation method such as a time signal. The delivered items effectively become the token that passes between the two generators to maintain synchronisation.

By eliminating proprietary networks the owner of such a secure container can use any delivery provider to make deliveries or collections. The sender of items may receive a label to affix to the goods from the owner of the secure container and therefore this system can be used to accept deliveries from friends and family as well as retailers. A retailer who wishes to use the system may be permitted to access the external generator. An interface for such a retailer would require them to know an identifier for the user—possibly part of the credit card number and postcode in order to identify the correct generator for the delivery key. By enabling the external server to generate the address label at the same time as the delivery key verification is provided that the item will be delivered to the correct location.

A master key may be provided that will always open the secure container. Since the user can always print a single use delivery key using the external generator, there is no strict need to have a master key.

To further enhance the security of the code generation, so called Gold Codes, developed by Robert Gold in 1967, may be employed. This involves taking two LFSRs and modulo 2 adding or XORing the two codes together. In this variation, the “seed” described in above could be used, rather than as a start point in a single PN code generator, but to set the phase difference between the two LFRRs. This multiples the complexity of a hostile attack on the coding system by a factor of several million.

Other features of the secure delivery system as described in Patent Citation 0006: WO WO 2006/109097 A (DELIVERY WORKS LIMITED). 2006-Oct.-19.

the disclosure of which is incorporated herein by reference, may be used together with this new approach to the generation and synchronisation of delivery keys.

The invention claimed is:

1. A delivery system comprising a combination lock providing access to a delivery space and an external delivery key generator processor; the lock comprising at least one means for inputting a delivery key, a processor for validating the delivery key, and a releasable latch that opens the lock in response to a valid delivery key, wherein the lock processor and the external delivery key generator processor each comprise a pseudo noise (PN) code generator that generates the same sequence of delivery keys, characterised in that the lock further comprises memory for storing used delivery keys, and in that the lock validating processor uses a recent valid delivery key to provide a pointer; the lock validating processor being programmed to: cause the pseudo noise (PN) code generator to generate a next delivery key after that pointer to compare with an input key and, if a match is not found, step the pointer forward through the sequence, and repeat a cycle of generating and matching with an input key for a predetermined number of cycles.

2. A delivery system as claimed in claim 1, wherein the pointer identifies a point in the PN sequence that is displaced by a predetermined number of codes before the position of the delivery key.

3. A delivery system as claimed in claim 1, further characterised in that if a match is not found within the predetermined number of cycles, the process is repeated with a pointer set by another of the stored valid delivery keys.

4. A delivery system as claimed in claim 1, wherein the predetermined number of cycles is adjusted in dependence on the situation of the lock and/or history of matching performance.

5. A delivery system as claimed in claim 1, wherein the means for inputting a delivery key comprises a bar-code reader for reading a bar code applied to the goods to be delivered.

6. A delivery system as claimed in claim 1, wherein the means for inputting a delivery key comprises a keypad for inputting a delivery key carried on the goods to be delivered.

7. A delivery system as claimed in claim 1, wherein the pseudo noise (PN) code generators are each started from an initial offset that is matched at initialisation of the system.

* * * * *